(12) United States Patent
Wolski

(10) Patent No.: US 12,497,464 B1
(45) Date of Patent: Dec. 16, 2025

(54) ANTIBODY, ANTIBODY FRAGMENTS OR PEPTIDE FOR TREATING CANCER AND METHODS OF FORMATION AND ADMINISTRATION

(71) Applicant: Berkeley Therapeutics, Inc., Oakland, CA (US)

(72) Inventor: Paul William Wolski, Oakland, CA (US)

(73) Assignee: Berkeley Therapeutics, Inc., Oakland, CA (US)

( * ) Notice: Subject to any disclaimer, the term of this patent is extended or adjusted under 35 U.S.C. 154(b) by 1195 days.

(21) Appl. No.: 17/194,287

(22) Filed: Mar. 7, 2021

Related U.S. Application Data

(63) Continuation-in-part of application No. 16/530,913, filed on Aug. 2, 2019, now abandoned.

(60) Provisional application No. 62/714,595, filed on Aug. 3, 2018.

(51) Int. Cl.
    *C07K 16/30* (2006.01)
    *C40B 30/04* (2006.01)

(52) U.S. Cl.
    CPC .......... *C07K 16/30* (2013.01); *C07K 2317/31* (2013.01); *C07K 2317/33* (2013.01); *C07K 2317/73* (2013.01); *C40B 30/04* (2013.01)

(58) Field of Classification Search
    None
    See application file for complete search history.

(56) References Cited

U.S. PATENT DOCUMENTS

| | | | |
|---|---|---|---|
| 5,079,344 A | 1/1992 | Chang et al. | |
| 5,089,603 A | 2/1992 | Chang et al. | |
| 5,281,699 A | 1/1994 | Chang | |
| 5,310,875 A | 5/1994 | Chang | |
| 5,690,934 A | 11/1997 | Chang et al. | |
| 5,866,129 A | 2/1999 | Chang et al. | |
| 9,688,776 B2 | 6/2017 | Chang et al. | |
| 10,377,829 B2 | 8/2019 | Chang et al. | |
| 2009/0220416 A1* | 9/2009 | Welt et al. | A61P 37/06 424/1.49 |
| 2010/0015044 A1* | 1/2010 | Qiu et al. | A61K 49/14 424/1.49 |
| 2012/0141463 A1 | 6/2012 | Wu et al. | |
| 2015/0086558 A1 | 3/2015 | Chang et al. | |
| 2016/0289339 A1 | 10/2016 | Chang et al. | |
| 2017/0298143 A1 | 10/2017 | Gurney et al. | |
| 2019/0062456 A1 | 2/2019 | Lonberg et al. | |
| 2019/0241676 A1 | 8/2019 | Tavazoie et al. | |
| 2019/0247510 A1 | 8/2019 | Stull et al. | |

OTHER PUBLICATIONS

Davis, F.M., Gossett, L.A., Chang, T.W., "An epitope on membrane-bound but not secreted IgE: implications in isotype-specific regulation." Biotechnology (NY). 1991; 9 (1):53-56. (Year: 1991 ).

Hung et al. "Lipid Rafts Hinder Binding of Antibodies to the Extracellular Segment of the Membrane-Anchor Peptide of mIgA." Molecular Immunology. Sep. 2011;48(15-16): 1975-82. (Year: 2011).

U.S. Appl. No. 16/530,913, filed Aug. 2, 2019 Non-Final Office Action dated Sep. 8, 2020.

Davis, F.M. et al. (Jan. 1991). "An Epitope on Membrane-Bound but not Secreted IgE: Implications in Isotype-Specific Regulation," Biotechnology 9(1):53-56.

Hung, A-F. H. et al. (Sep. 2011, e-pub. Jul. 1, 2011). "Lipid Rafts Hinder Binding of Antibodies to the Extracellular Segment of the Membrane-Anchor Peptide of mIgA," Molecular Immunology. 48(15-16):1975-1982.

IgA Antibody, https://www.genscript.com/IgA-antibody.html, May 27, 2021, pp. 1-5.

R. Sitia et al., Membrane-Bound and Secretged IgA Contain Structurally Different Alpha-Chains, The Journal of Immunology, J Immunol 1982; 128:712-716, Apr. 10, 2018, http://www.jimmunol.org/content/128/2/712.

Shabnam Shalpour et al., Inflammation-Induced IgA+ Cells Dismantle Anti-Liver Cancer Immunity, doi: 10.1038/nature24302, Nov. 16, 2017, vol. 551, Nature 340-345.

Wolski, Paul, "Antibody, Antibody Fragments or Peptide for Treating Cancer and Methods of Formation and Administration ," filed Aug. 2, 2019, U.S. Appl. No. 16/530,913 including its prosecution history.

* cited by examiner

*Primary Examiner* — Kaijiang Zhang
(74) *Attorney, Agent, or Firm* — MORRISON & FOERSTER LLP

(57) ABSTRACT

Treatments for pathogens and diseases are disclosed. More specifically, various treatments disclosed include the use of antibodies that specifically target receptors within cells. The binding of the antibody to a receptor within the cell causes the death of the cell. Various treatments are directed to the targeting of cells associated with diseases such as cancers.

12 Claims, 7 Drawing Sheets

Specification includes a Sequence Listing.

Amino acid sequence:

Pro Val Pro Ser Thr Pro Pro Thr Pro Ser Pro Ser Thr Pro Pro Thr Pro Ser Cys

Fig. 5

Amino Acid sequence:

Pro Val Pro Pro Pro Pro Pro Cys

Fig. 6

Amino Acid Sequence

```
Gly Ser Cys Ser Val Ala Asp Trp Gln Met Pro Pro Pro Tyr Val Val Leu
 G   S   C   S   V   A   D   W   Q   M   P   P   P   Y   V   V   L

Asp Leu Pro Gln Glu Thr Leu Glu Glu Glu Pro Gly Ala Asn
 D   L   P   Q   E   T   L   E   E   E   P   G   A   N
```

ANTIBODY, ANTIBODY FRAGMENTS OR PEPTIDE FOR TREATING CANCER AND METHODS OF FORMATION AND ADMINISTRATION

CROSS-REFERENCE TO RELATED APPLICATIONS

This application is a Continuation-in-Part of U.S. patent application Ser. No. 16/530,913, filed Aug. 2, 2019, which is claims the benefit of priority to U.S. Provisional Application No. 62/714,595, filed Aug. 3, 2018, the entire contents of which are incorporated by reference herein.

INCORPORATION-BY-REFERENCE OF SEQUENCE LISTING

This application includes a Sequence Listing, which has been electronically submitted in ASCII format, and which is hereby incorporated by reference herein in its entirety. The Sequence Listing in ASCII format is named "0001P2 SequenceListing.txt." was created on May 24, 2021, and has a size of 1, 119 bytes.

FIELD

Embodiments of the disclosure relate to the treatment of pathogens and diseases. More specifically, one embodiment of the disclosure relates to a method for treating cancer through exploitation of factors in the tumor microenvironment.

BACKGROUND

It has been shown that cancer can secrete chemicals called cytokines including, but not limited to, transforming growth factor beta ("TGFβ"). These factors are known to transform the B cells in a tumor microenvironment ("TME") and cause the B cells to express Immunoglobulin A ("IgA") on their surface. IgA is an antibody that aids in the immune function of mucous membranes. IgA exists in two isoforms IgA1 and IgA2. Each isoform can be membrane bound or free floating (e.g., as a dimeric form). The majority of IgA that exists in the body is free floating in the gastrointestinal tract. Additionally, IgA is associated with the disease IgA nephropathy.

When cancer is present, the IgA causes the immune system including, but not limited to, the cytoxic T cells, to ignore this area immediately around the cancer (the TME) including the immunoglobulin-A-producing (IgA+) cells and the tumor itself. However, the mechanism by which the inhibition of immune response by IgA happens is not fully understood yet. Herein, a cytoxic T cells may be referred to as a CD8+ T cell and/or a killer T cell.

Additionally, there might also be other inhibitory factors in and/or on the TME, including but not limited to B cells in it, or on the tumor cells themselves. The inhibitory factors include, but are not limited to, cells undergoing autophagy factors inducing the cells to undergo autophagy and/or divide more slowly than other cancer cells, including but not limited to hypoxia.

BRIEF DESCRIPTION OF THE DRAWINGS

The invention may best be understood by referring to the following description and accompanying drawings that are used to illustrate embodiments of the invention. In the drawings:

FIG. 5 provides a sequence (SEQ ID NO: 1) of an epitope for isoform 1 of IgA (IgA1) that is unique to IgA1 compared to IgA2 and could be used for an antibody to selectively target and bind to IgA1 while not binding to IgA2 in accordance with some embodiments:

FIG. 6 provides a sequence (SEQ ID NO: 2) of an epitope for isoform 2 of IgA (IgA2) that is unique to IgA2 compared to IgA1 and could be used for an antibody to selectively target and bind to IgA2 while not binding to IgA1 in accordance with some embodiments; and FIG. 7 provides one example of an extracellular sequence of amino acids (SEQ ID NO: 3) that is selective for membrane-bound IgA and not found in IgA in free form in accordance with some embodiments.

DETAILED DESCRIPTION

Figure 1:
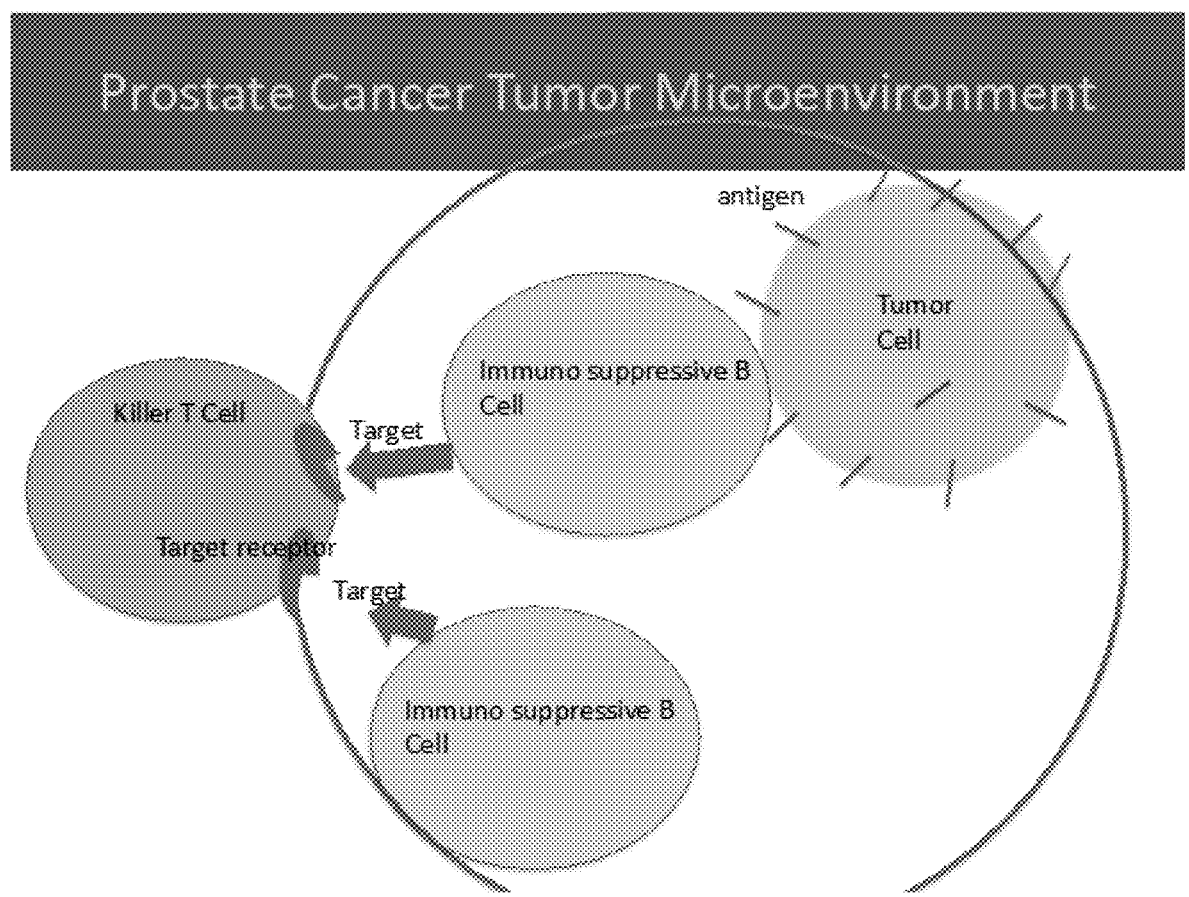
FIG. 1 provides an illustration of a cancer tumor microenvironment in accordance with some embodiments.

Before some particular embodiments are provided in greater detail, it should be understood that the particular embodiments provided herein do not limit the scope of the concepts provided herein. It should also be understood that a particular embodiment provided herein can have features that may be readily separated from the particular embodiment and optionally combined with or substituted for features of any of a number of other embodiments provided herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counterclockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a." "an," and "the" include plural references unless the context clearly dictates otherwise. Unless defined otherwise, all technical and scientific terms used herein have the same meaning as commonly understood by those of ordinary skill in the art.

IgA has been shown to act as an inhibitory signal: however, in the gastrointestinal tract IgA acts to clear unwanted/foreign material. This inhibitory signal in the serum of IgA has been shown in some instances to block IgG binding and phagocytosis of some pathogens experimentally. Also, it has been shown that some medical patients who are IgA deficient have some degree of autoimmunity, suggesting IgA can provide some protection from the immune system. Thus, the expression of IgA in the TME or on the cancer itself may be a way by which the cancer escapes being killed by the immune system. Additionally, it has been shown recently that mice with prostate cancer with very low levels of IgA (by RNAi) had lower tumor volumes and had better immune response in the TME and to the tumor than non RNA modified mice.

Embodiments of the disclosure in a composition of matter and methods for treating cancer. Specifically, some embodiments disclose a composition of matter and methods for treating prostate cancer. Specifically, some embodiments disclose the same for treating any cancer with IgA expressed in the TME. The following embodiments refer to human forms of the proteins/antibodies discussed. However, these embodiments could also apply to mice or other mammals for experimental purposes, or for production purposes in human-animal chimeric form.

In some embodiments, a method for treating cancer includes exploiting (e.g., blocking, eliminating or reducing in quantity) factors in the tumor microenvironment ("TME"), as well as on the cancer itself (e.g., in and/or on the cancer cells).

In one embodiment, as IgA is often associated with the disease "IgA nephropathy," one embodiment of the disclosure illustrates how an alternative antibody against IgA could bind to the TME and/or the cancer cells and to encourage the immune system, the IgA$^+$ cells, including B Cells to interact (e.g., attack) the cancer cells.

As referenced herein, IgA is shown to be inhibitory, and removing IgA with RNAi has been shown to have a positive effect when fighting cancer, when in combination with chemotherapeutics, as compared to using chemotherapy without the IgA removal in mice. However, in humans there are two isoforms of IgA: IgA1 and IgA2. The disclosure herein demonstrates multiple embodiments of generating an antibody (or antibody fragment or peptide, collectively referred to as an "antibody"). In one embodiment, the antibody may bind to both versions of IgA. In a second embodiment, the antibody may selectively bind to only one version of IgA (e.g., the version that is found in the TME and is suppressing the immune system). The engineering of the antibody will be done by generating antibodies via phage display, yeast display or other techniques and screening the antibodies that only bind to the desired isoform of IgA and not to the other (or to other proteins or targets in the body). By doing so, this will generate a therapeutic with limited off-target toxicity. There are regions of differentiation between the different isoforms of IgA, including those that are membrane bound and not, and IgA1 and IgA2. The process of selective screening to only one isoform may also be applied to other targets both in the TME and in general.

More specifically, embodiments of the disclosure include various cancer treatments by exploiting (blocking or eliminating or reducing in quantity) factors in the tumor microenvironment, as well as on the cancer itself or doing the same to the ligand of that factor, which may be, for example, the transmembrane receptor (FcαRI), which may be referred to as Cluster of Differentiation 89 or "CD89," or other molecules.

Specifically, regarding IgA, there are two isoforms. In some embodiments, the therapeutic molecule binds to or inhibits only one of these two versions, which may avoid off target effects on the patient. For example, in some embodiments, the therapeutic molecule may bind to IgA1. However, in other embodiments, the therapeutic module may bind to IgA2.

In yet other embodiments, the therapeutic molecule, e.g., an antibody, may bind to the IgA (selective for the isoform on it) on the B cells in the TME or to an alternative target on B cells in the TME each of which resulting in the death of these cells or the end of the expression of IgA on them. It would be possible to purchase and humanize an antibody that binds to both isoforms of IgA (and both the membrane and free version). However, this is not efficient solution for multiple reasons. For example, the patient could reject the animal part of the humanized antibody, but also more specific to the IgA is the multiple isoforms of it and currently available antibodies have not been selected to bind exclusively to one isoform and could cause off target deleterious responses.

IgA exists typically as a dimer in the "free-floating" (free IgA). Additionally, for reasons other than dimerization, the two isoforms IgA1 and IgA2 have slightly different 3D folds. This could be where a blocking therapeutic could be very efficient.

One embodiment of the method disclosed herein includes engineering an antibody and/or antibody fragment or other peptide (binding peptide) to bind to the individual surface (exposed outside a cell, including but not limited to B cells in the TME or cancer cells themselves) part of IgA1 and for IgA2 respectively. In one embodiment, IgA1 acts as the target on the surface. In another embodiment IgA2 acts as the target on the surface of these cells.

Following the engineering and formation of the antibody, antibody fragment or peptide, the method may also include confirming which isoform is on the cancer using the binding peptide via methods including but not limited to immunohistochemistry and/or ELISA including but not limited to in combination with binding the newly generated antibody selective for IgA1 or IgA2. Subsequently, this binding peptide is employed as a treatment for cancer, with prostate cancer being the first one to target, but it could be applicable to any cancer with IgA in its microenvironment. It could be combined with other applicable treatments for cancer.

The binding peptide as described above could be employed as a diagnostic for severity of cancer and whether this particular treatment would work on a particular patient. The binding peptide could be attached to a fluorescent tag or radio-active tag and used for in vitro or in vivo diagnosis.

This treatment and diagnostic technique could be applied to other targets in the tumor microenvironments on the same or other cancers.

Prior to doing the above the individual antibody for each fragment will be made that only binds to the membrane bound version of one respective isoform of the target, be it IgA or another (in such a way that all humans who have slight variations will still have their bound by the antibody.

This will be done both in a random fashion, but also with structural knowledge of any sequences that are conserved in the versions wanted to be targeted.

Again, this could also be exploited genetically, using techniques such as RNA interference ("RNAi") or CRISPR technology to remove the target as well. This could be enhanced by targeting it to the tumor or TME, possibly via encapsulation in a membrane or viral vector. The leaky vasculature around the tumor could enhance this.

Figure 2:
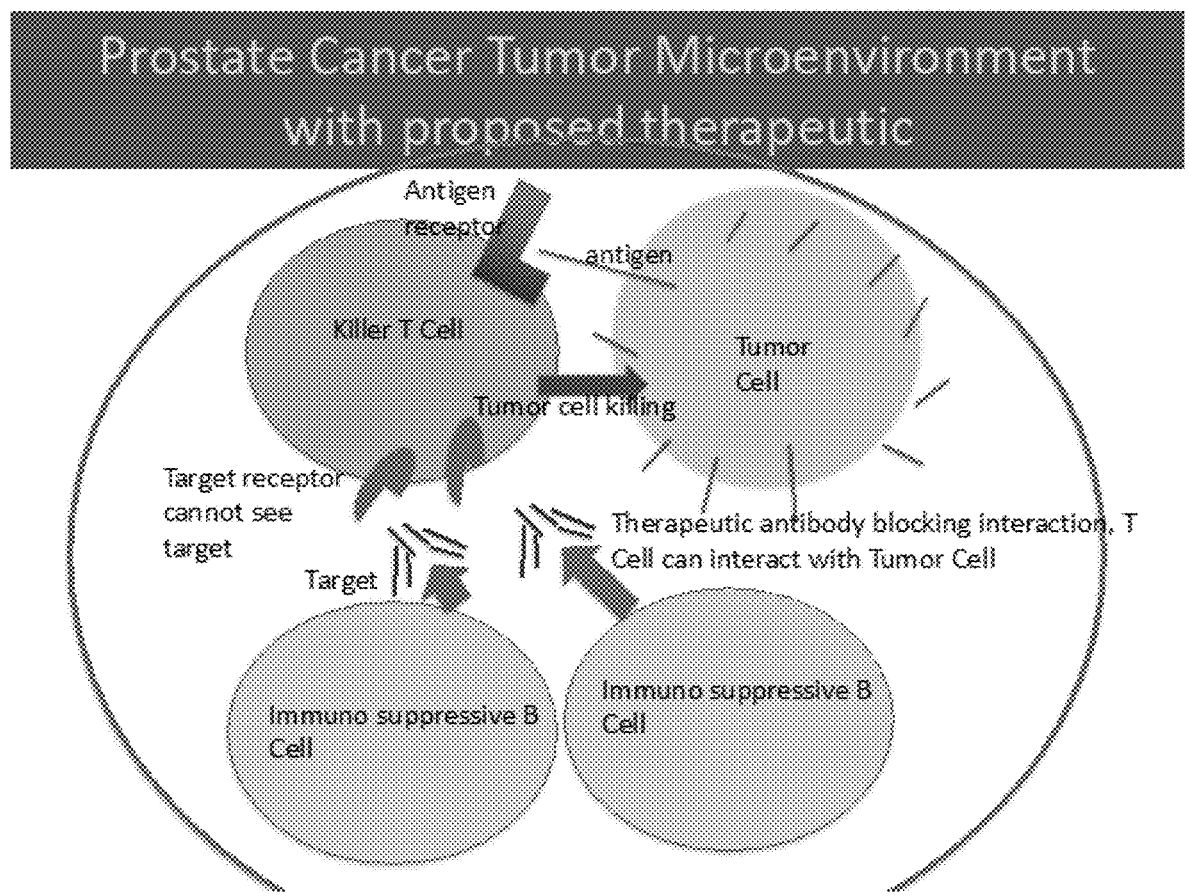
FIG. 2 provides an illustration of a proposed therapeutic in the cancer tumor microenvironment of FIG. 1 in accordance with some embodiments.

With respect to FIG. 1 and FIG. 2, example illustrations are shown applying the technique discussed above using prostate cancer as a case example. Referring now to FIG. 1, the target could be IgA1 or IgA2 in this case. The B cells that have the immunosuppressive target (which could be, but is not limited to one of the isoforms of IgA) are keeping the killer T cells out of the TME. This scenario gives a poor prognosis for the patient.

With respect to FIG. 2, an illustrative scenario of FIG. 1 is shown in which the therapeutic antibody is present. In the embodiment of FIG. 2, anti-IgA1 or anti-IgA2 is employed to block the target, allowing the killer T cells to enter the TME and ultimately kill the cancer cells. The same scenario of these two figures would result if the target were removed genetically.

Figure 3:
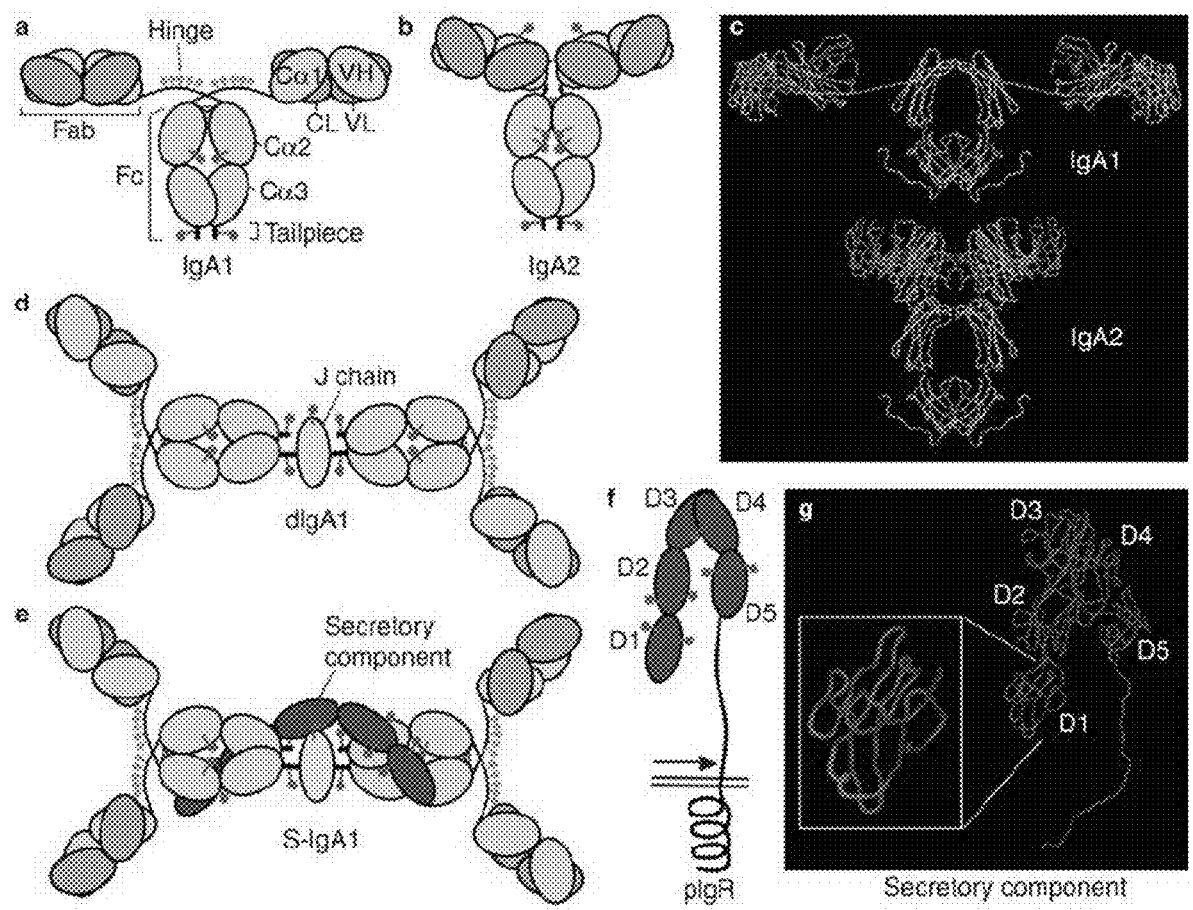
FIG. 3 provides an illustration of structures of IgA antibodies in accordance with some embodiments in accordance with some embodiments.
Figure 4:
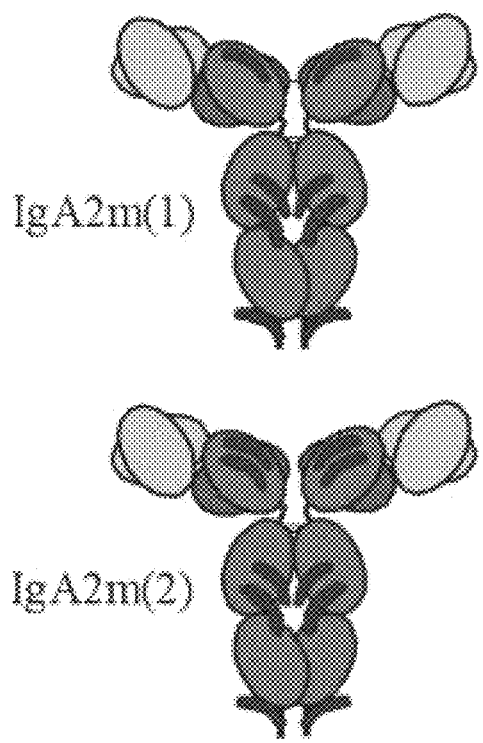
FIG. 4 provides additional illustration of two versions of the IgA2, further expanding upon the embodiments illustrated in FIG. 3 in accordance with some embodiments.

With respect to FIG. 3 and FIG. 4, an illustration of structures of IgA antibodies in accordance with some embodiments in accordance with some embodiments. FIG. 3 illustrates various versions of IgA, illustrates each variation's structural differences and how it would be feasible to make a blocking peptide against an individual version of IgA.

There are clearly regions of differentiation that could be exploited and against which to generate a blocking peptide such as a monoclonal antibody. For example, one isoform has a hinge region that the other does not. Membrane bound versions have a membrane anchor, some of which exists outside the cell to which it is bound, and that could also be a region to target.

It is also evident how the different isoforms of IgA also have significant amount of similarity indicating why a generic anti IgA antibody would very likely target all versions, which could have off target, toxic effects for the patient.

Should the immunosuppressive target be another molecule the same techniques described above can be implemented for selectively targeting one version of it. It can also include removing the target genetically using means such as RNAi or CRISPR as well as selectively removing the entire cells (potentially focused solely on the TME) having the immunosuppressive target on their surface.

By exploiting the areas that are distinct among them, which could be done predictively based on this information or via lab screening, it is possible to make an antibody that binds to only one isoform and also to only the monomer and not the dimer or vice versa.

Referring now to FIGS. 5-7, sequences of epitopes are provided. FIG. 5 provides a sequence (SEQ ID NO: 1) of an epitope for isoform 1 of IgA (IgA1) that is unique to IgA1 compared to IgA2 and could be used for an antibody to selectively target and bind to IgA1 while not binding to IgA2. FIG. 6 provides a sequence (SEQ ID NO:2) of an epitope for isoform 2 of IgA (IgA2) that is unique to IgA2 compared to IgA1 and could be used for an antibody to selectively target and bind to IgA2 while not binding to IgA1. FIG. 7 provides one example of an extracellular sequence (SEQ ID NO:3) of amino acids that is selective for membrane-bound IgA and not found in IgA in free form. It is noted that there may be variations on this sequence by one or more amino acids. This sequence is part of the extracellular region of the membrane anchoring region of membrane-bound IgA. This sequence has been described as extracellular in U.S. Pat. No. 5,310,875. There likely are other epitopes that can be used to bind to solely the membrane bound version of IgA (either IgA1 or IgA2 or both). A couple examples are described in Chang, et. al, US PT. U.S. Pat. No. 9,688,776. However, the examples described by Chang et. al do not necessarily bind selectively to IgA1 or IgA2 nor do they necessarily bind selectively to the membrane bound version of either. Any of this potential off target binding could result in negative effects for the patient. Chang et. al do not suggest using such antibodies they propose for treating cancer either.

It is possible to generate selective antibodies to membrane bound IgA1 (mIgA1) and/or to membrane bound IgA2 (mIgA2) using the following method: Generate an antibody phage display or yeast surface display library or purchase a premade one, and then select the antibody variants first that bind to the target of interest by standard methods, and then screen for variants that do not bind the other versions of IgA (free or the membrane bound version of the other isoform). This could be done by selecting the non-binding antibody variants that would be washed away in the same standard process in which one would do to collect the variants that do bind to the target of interest. The targets of interest could be either the whole extracellular versions of the version of IgA desired (and the ones not desired) or with it could also be the epitopes described in FIG. 5-7. Using the unique epitopes for screening would likely eliminate much of the need for the anti-screening for antibodies that do not bind to other versions of IgA that one does not want the antibody to bind.

In one embodiment, a way to ensure selective binding to the membrane bound version of the desired isoform of IgA would be to generate a bispecific antibody using standard techniques wherein one half of the antibody's variable regions bind to the epitope in FIG. 5 and the other binds to the epitope in FIG. 7. Another embodiment for this desired specificity would be to generate a bispecific antibody using standard techniques wherein one half of the antibody's variable regions bind to the epitope in FIG. 6 and the other binds to the epitope in FIG. 7. Such a bispecific antibody could also be generated by combining the paratopes identified in the screening process described above.

As discussed above, the main focus is to generate a monoclonal therapeutic antibody that is selective for the immunosuppressive B cells in the tumor microenvironment. Off target binding is something we want to prevent. Therefore, FIGS. 5-7 show one method to identify an antibody that would selectively bind to exclusively membrane bound IgA1 and one to bind exclusively to membrane bound IgA2.

There are other differences between mIgA1, mIgA2, and free IgA of either form that could be exploited to make selective antibodies for mIgA1 and for mIgA2, and these include differences in glycosylation patterns, 3D structure, and also other possible amino acid differences, notably especially among the alpha chain of IgA.

Another way to treat cancer could be to conjugate the selective antibody for the relevant IgA isoform in the cancer to a cytotoxic agent that could also aid in killing the cancer.

It also could be possible to conjugate the selective antibody for the form of membrane bound IgA found in cancer as a diagnostic, by conjugating such antibody to radioactive isotopes, MRI-contrasting agent, or fluorescent agents, or other detectable agents in diagnostics.

While some particular embodiments have been provided herein, and while the particular embodiments have been provided in some detail, it is not the intention for the particular embodiments to limit the scope of the concepts presented herein. Additional adaptations and/or modifications can appear to those of ordinary skill in the art, and, in broader aspects, these adaptations and/or modifications are encompassed as well. Accordingly, departures may be made from the particular embodiments provided herein without departing from the scope of the concepts provided herein.

What is claimed is:

1. A method of generating an antibody or fragment thereof that selectively binds to membrane bound IgA, comprising:
   (i) providing an antibody phage display or yeast surface display library, and
   (ii) selecting for a plurality of antibodies or fragments thereof that binds to membrane bound IgA (mIgA) and screening the selected plurality of antibodies or fragments thereof for an antibody or fragment thereof that binds to a membrane bound IgA but does not bind to free IgA,
      wherein selecting for a plurality of antibodies or fragments thereof that binds to the membrane bound IgA comprises selecting for an antibody or fragment thereof that binds to SEQ ID NO: 3, or a sequence variation of SEQ ID NO: 3 differing by one amino acid,
      thereby generating the antibody or fragment thereof that selectively binds to membrane bound IgA, wherein the membrane bound IgA is membrane bound IgA1 (mIgA1).

2. The method of claim 1, wherein the antibody or fragment thereof that selectively binds to membrane bound IgA binds to membrane bound IgA1 (mIgA1) but not membrane bound IgA2 (mIgA2).

3. The method of claim 1, wherein the method further comprises
   (i) providing a second antibody phage display or yeast surface display library and
   (ii) selecting for a second plurality of antibodies or fragments thereof that bind to SEQ ID NO: 1 and do not bind to SEQ ID NO: 2, wherein the method generates an antibody or fragment thereof that selectively binds to membrane bound IgA1.

4. The method of claim 1, wherein the method generates an antibody or fragment thereof that selectively binds to membrane bound IgA1, wherein the antibody or fragment thereof that selectively binds to membrane bound IgA1 is a bispecific antibody comprising
   (i) a first half antibody comprising a first heavy chain and a first light chain from the selected antibody that binds to SEQ ID NO: 3, or a sequence variation of SEQ ID NO: 3 differing by one amino acid, and
   (ii) a second half antibody comprising a second heavy chain and a second light chain from an antibody that binds to SEQ ID NO: 1 and does not bind to SEQ ID NO: 2.

5. A method of generating an antibody or fragment thereof that selectively binds to IgA2, comprising:
   (i) providing an antibody phage display or yeast surface display library, and
   (ii) selecting for a plurality of antibodies or fragments thereof that binds to IgA2 and screening the selected plurality of antibodies or fragments thereof for an antibody or fragment thereof that binds to IgA2 but does not bind to IgA1, thereby generating the antibody or fragment thereof that selectively binds to IgA2, wherein the IgA2 is membrane bound IgA2 (mIgA2).

6. The method of claim 5, wherein selecting for a plurality of antibodies or fragments thereof that binds to IgA2 comprises selecting for an antibody or fragment thereof that binds to SEQ ID NO: 2 and does not bind to SEQ ID NO: 1.

7. The method of claim 6, wherein the method generates an antibody or fragment thereof that selectively binds to membrane bound IgA2, wherein the antibody or fragment thereof that selectively binds to membrane bound IgA2 is a bispecific antibody comprising
   i) a first half antibody comprising a first heavy chain and a first light chain from the selected antibody that binds to SEQ ID NO: 2 and
   ii) a second half antibody comprising a second heavy chain and a second light chain from an antibody that binds to SEQ ID NO: 3, or a sequence variation of SEQ ID NO: 3 differing by one amino acid.

8. The method of claim 5, wherein the method comprises step (ii) and further comprises
   (i) providing a second antibody phage display or yeast surface display library and
   (ii) selecting for a second plurality of antibodies or fragments thereof that binds to SEQ ID NO: 3, or a sequence variation of SEQ ID NO: 3 differing by one amino acid,
      wherein the method generates an antibody or fragment thereof that selectively binds to membrane bound IgA2.

9. A method of generating an antibody or fragment thereof that selectively binds to IgA1, comprising:
   (i) providing an antibody phage display or yeast surface display library, and
   (ii) selecting for a plurality of antibodies or fragments thereof that binds to IgA1 and screening the selected plurality of antibodies or fragments thereof for an antibody or fragment thereof that binds to IgA1 but does not bind to IgA2, thereby generating the antibody or fragment thereof that selectively binds to IgA1, wherein the IgA1 is membrane bound IgA1 (mIgA1).

10. The method of claim 9, wherein the method comprises the selecting step of (ii) and further comprises
   (1) providing a second antibody phage display or yeast surface display library and
   (2) selecting for a second plurality of antibodies or fragments thereof that bind to SEQ ID NO: 3, or a sequence variation of SEQ ID NO: 3 differing by one amino acid,
      wherein the method generates an antibody or fragment thereof that selectively binds to membrane bound IgA1.

11. The method of claim 9, wherein selecting for a plurality of antibodies or fragments thereof that binds to IgA1 comprises selecting for an antibody or fragment thereof that binds to SEQ ID NO: 1 and does not bind to SEQ ID NO: 2, and
   wherein the method generates an antibody or fragment thereof that selectively binds to membrane bound IgA1, wherein the antibody or fragment thereof that selectively binds to membrane bound IgA1 is a bispecific antibody comprising
      i) a first half antibody comprising a first heavy chain and a first light chain from the selected antibody that binds to SEQ ID NO: 1 and
      ii) a second half antibody comprising a second heavy chain and a second light chain from an antibody that binds to SEQ ID NO: 3, or a sequence variation of SEQ ID NO: 3 differing by one amino acid.

12. The method of claim 9, wherein selecting for a plurality of antibodies or fragments thereof that binds to IgA1 comprises selecting for an antibody or fragment thereof that binds to SEQ ID NO: 1 and does not bind to SEQ ID NO: 2.

* * * * *

SEQUENCE LISTING

```
<160> NUMBER OF SEQ ID NOS: 3

<210> SEQ ID NO 1
<211> LENGTH: 19
<212> TYPE: PRT
<213> ORGANISM: Homo sapiens

<400> SEQUENCE: 1

Pro Val Pro Ser Thr Pro Pro Thr Pro Ser Pro Ser Thr Pro Pro Thr
1               5                   10                  15

Pro Ser Cys

<210> SEQ ID NO 2
<211> LENGTH: 8
<212> TYPE: PRT
<213> ORGANISM: Homo sapiens

<400> SEQUENCE: 2

Pro Val Pro Pro Pro Pro Pro Cys
1               5

<210> SEQ ID NO 3
<211> LENGTH: 31
<212> TYPE: PRT
<213> ORGANISM: Homo sapiens

<400> SEQUENCE: 3

Gly Ser Cys Ser Val Ala Asp Trp Gln Met Pro Pro Pro Tyr Val Val
1               5                   10                  15

Leu Asp Leu Pro Gln Glu Thr Leu Glu Glu Glu Pro Gly Ala Asn
            20                  25                  30
```